United States Patent
Mochizuki

[11] Patent Number: 6,125,787
[45] Date of Patent: Oct. 3, 2000

[54] AUTOMATIC SPRAY APPARATUS FOR OILY CONFECTIONERY RAW MATERIAL

[75] Inventor: Keizo Mochizuki, Saitama, Japan

[73] Assignee: Meiji Seika Kaisha, Ltd., Tokyo, Japan

[21] Appl. No.: 09/017,707

[22] Filed: Feb. 5, 1998

[30] Foreign Application Priority Data

Feb. 5, 1997 [JP] Japan .................................. 9-022420

[51] Int. Cl.$^7$ .................................................. B05C 5/00
[52] U.S. Cl. ........................... 118/24; 118/302; 239/135; 239/407; 239/537; 239/541
[58] Field of Search ............................. 118/24, 302, 712; 239/537, 541, 407, 135

[56] References Cited

U.S. PATENT DOCUMENTS

| | | | |
|---|---|---|---|
| 3,174,689 | 3/1965 | McIntyre | 239/541 |
| 3,185,129 | 5/1965 | Sollich | 118/24 |
| 5,725,154 | 3/1998 | Jackson | 239/135 |

FOREIGN PATENT DOCUMENTS

| | | |
|---|---|---|
| 0 212 442 | 3/1987 | European Pat. Off. . |
| 0 554 707 | 8/1993 | European Pat. Off. . |
| 1 200 663 | 9/1965 | Germany . |
| 1816945 | 6/1970 | Germany . |
| 30 07 990 | 9/1981 | Germany . |
| 31 08 793 | 9/1982 | Germany . |
| 43 03 113 | 8/1994 | Germany . |
| 1503682 | 3/1978 | United Kingdom ..................... 118/24 |
| 2 085 321 | 4/1982 | United Kingdom . |
| 2 249 740 | 5/1992 | United Kingdom . |

*Primary Examiner*—Laura Edwards
*Attorney, Agent, or Firm*—Sughrue, Mion, Zinn, Macpeak & Seas, PLLC

[57] ABSTRACT

A spray apparatus for spraying oily confectionery row material, wherein a nozzle cap is disposed around a nozzle, the nozzle cap is interlocked with a nozzle-cap-bar drive disc through a nozzle cap driving bar, and the nozzle-cap-bar drive disc is coupled with a cap-bar drive motor so that the nozzle-cap-bar drive disc is lengthwise moved to a desired position. The spray apparatus can independently control a spraying area and a particle size of the sprayed oily confectionery material in simple and automatic manner when the oily confectionery raw material is sprayed.

4 Claims, 2 Drawing Sheets

AUTOMATIC SPRAY APPARATUS FOR OILY CONFECTIONERY RAW MATERIAL

BACKGROUND OF THE INVENTION

1. Field of the Invention

The present invention relates to a spray apparatus for spraying oily confectionery raw material which is capable of optionally controlling the spray area while keeping the particle size of sprayed particles and automatically controlling a spraying area and the particle size of sprayed oily confectionery raw material, in order to uniformly coating the raw material such as chocolate, white chocolate and oily cream onto the surface of food.

2. Description of the Related Art

Two methods for spraying the oily confectionery raw material have been known: an air spraying method using the compressed air for spraying the oily confectionery raw material and an airless spraying method in which the oily confectionery raw material is sprayed through a nozzle by use of a pressure tank or a high pressure pump. In the method for spraying the oily confectionery raw material using the compressed air, the amount or the pressure of compressed air is varied in order to control the spraying area and the particle size of the sprayed particles. When the amount or the pressure of compressed air is varied, the spraying area and the particle size are both changed. Therefore, the method is hard to control the spraying area and the particle size independently. In the airless spraying method in which the pressure tank or the high pressure pump is used for spraying, there is a method in that the liquid pressure supplied to a nozzle is varied to control the spraying area. In this case, the variation of the spraying area entails the variation of the particle size. Therefore, this method is also hard to control the spraying area and the particle size independently.

As described above, the air and airless spraying methods cannot meet the demand in this field., viz., they are hard to control the spraying area and the particle size independently. Meanwhile, the particle size is generally reduced when the spraying area is increased. Accordingly, a method in which the spraying area can be varied while keeping the particle size has been required.

In the airless spray method, in order to control the spraying area and the particle size of sprayed particles, it is necessary to control the pump pressure of the high pressure pump, to select a nozzle chip and to control the viscosity of the oily confectionery raw material. In the air spray method, in order to control them, it is necessary to control the pressure of the spraying pressured air, to control the viscosity of the raw material supplied to the nozzle and to control the amount of the providing raw material. Accordingly, the complexed adjustment, that is, the spraying area and the particle size are required to be controlled by the above complexed controls.

SUMMARY OF THE INVENTION

It is an object of the present invention to provide a spray apparatus capable of easily and automatically controlling the spraying area and the size of the sprayed particles, more specifically, an automatic spray apparatus for oily confectionery raw material capable of optionally changing the spray area while keeping the particle size.

The present invention provides a spray apparatus for spraying oily confectionery raw material, wherein a nozzle cap is disposed around a nozzle, the nozzle cap is interlocked with a nozzle-cap-bar drive disc through a nozzle cap driving bar, and the nozzle-cap-bar drive disc is coupled with a cap-bar drive motor so that the nozzle-cap-bar drive disc is lengthwise moved to a desired position.

DETAILED DESCRIPTION OF THE INVENTION

Detailed description of the present invention will be described as follows referring to the accompanying drawing.

Figure 1:
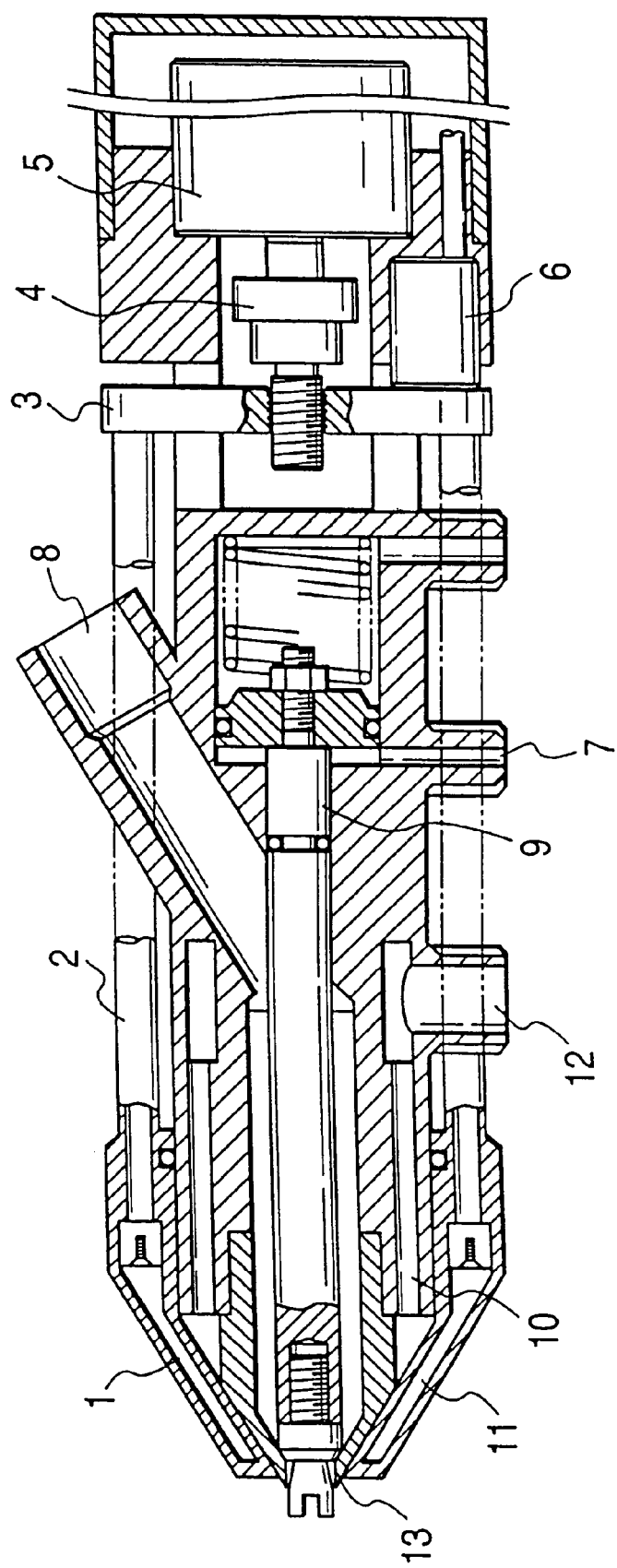
FIG. 1 is a sectional view of a spray apparatus according to an embodiment of the present invention, in which a nozzle cap is in a retracted position.
Figure 2:
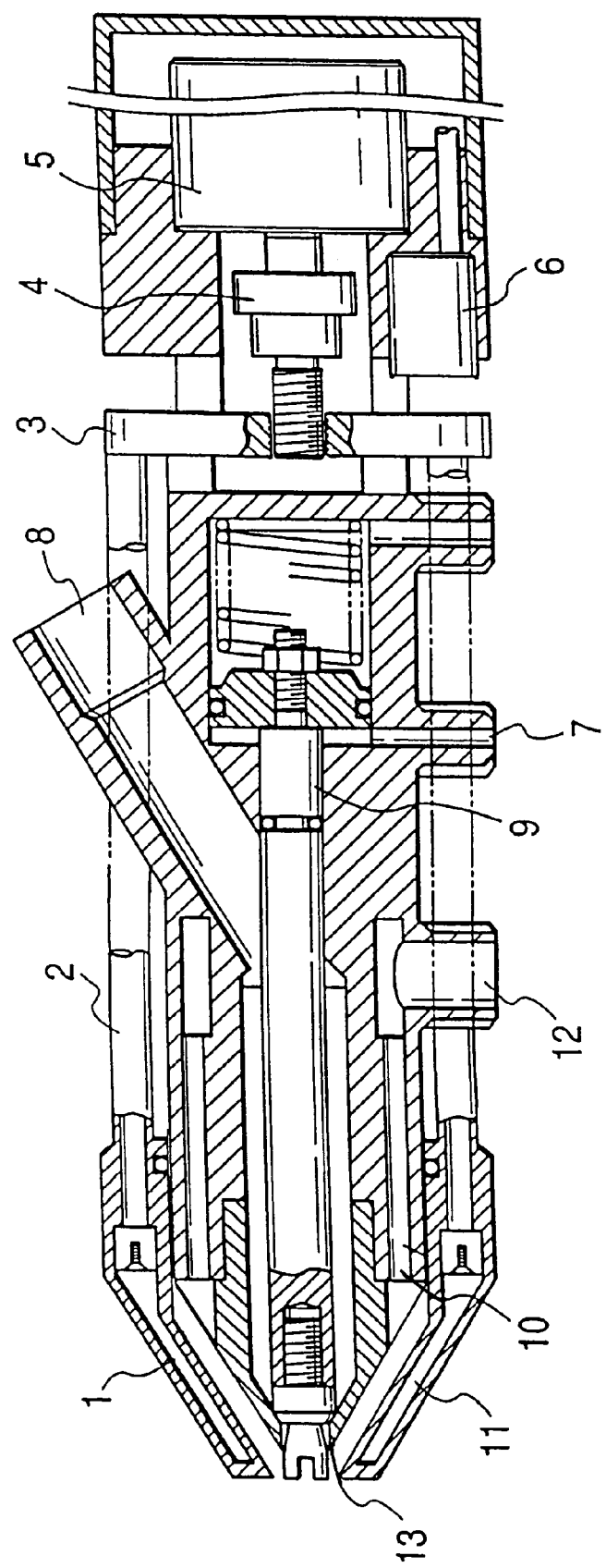
FIG. 2 is a sectional view of a spray apparatus according to an embodiment of the present invention, in which the nozzle cap is in an extended position.

FIGS. 1 and 2 show a construction of a spray apparatus for spraying oily confectionery raw material which can independently control a spraying area and a particle size of the sprayed oily confectionery raw material particles in simple and automatic manner. In FIGS. 1 and 2, reference numeral 1 represents a nozzle cap; 2, a nozzle cap driving bar; 3, a nozzle-cap-bar drive disc; 4, a slipping clutch with a screw; 5, a cap-bar drive motor; 6, a nozzle-cap drive control sensor; 7, a compressed air inlet for driving a needle valve; 8, an oily confectionery raw material inlet; 9, a needle; 10, a spray air outlet; 11, a cap heater; 12, a spray air inlet; and 13, a nozzle. To be more specific, the nozzle cap 1 may be moved by the nozzle cap driving bar 2 in the lengthwise direction. The nozzle cap driving bar 2 is coupled with the nozzle-cap-bar drive disc 3. The nozzle-cap-bar drive disc 3 is a disc-like member having a threaded hole in the central part thereof. The slipping clutch 4 with a screw is coupled into the threaded hole of the nozzle-cap-bar drive disc 3. The slipping clutch 4 is also coupled with the cap-bar drive motor 5. A current position of the nozzle-cap-bar drive disc 3, which is movable, is detected by the nozzle-cap drive control sensor 6. Oily confectionery raw material is introduced into the spray apparatus, through the oily confectionery raw material inlet 8. At this time, the needle 9 is moved by the compressed air that is introduced through the compressed air inlet 7, and the oily confectionery raw material is discharged through the nozzle 13. In this case, in order to spray fine particles of the oily confectionery raw material, compressed air is introduced into the apparatus through the spray air inlet 12 and discharged through the spray air outlet 10. The cap-bar drive motor 5 is driven to operate the slipping clutch 4, and then, the nozzle cap 1 is moved via the nozzle cap driving bar 2.

As a result, a gap is formed between the nozzle cap 1 and the nozzle 13. The compressed air passing through the spray air outlet 10 is discharged to the outside of the nozzle through the gap. Consequently, the oily confectionery raw material discharged from the nozzle is sprayed in the form of fine particles.

The movement distance of the nozzle cap 1 is increased to thereby expand the spraying area of the oily confectionery raw material. The position of the nozzle-cap-bar drive disc 3 is detected by the nozzle-cap drive control sensor 6 to measure the movement distance of the nozzle cap 1. The nozzle cap movement distance is set on the basis of the measured distance. In this way, the gap between the nozzle cap 1 and the nozzle 13 is controlled to achieve a desired spraying area. A spraying area and a particle size of the oily confectionery raw material sprayed may be controlled by use of the set one. Thus, the spray apparatus thus constructed can control the spraying area while setting the particle size of the sprayed oily confectionery raw material at a fixed value.

The particle size of the sprayed oily confectionery raw material increases as the diameter of the nozzle 13 is increased. The diameter of the nozzle may be set at a desired value by using the nozzle so manufactured.

In use, usually, the spray apparatus is fixed while being vertically directed with its nozzle facing downward. If required, it may be installed in any direction of 360° in use. The direction of the spray apparatus, when it is installed, is selected depending on a viscosity of oily confectionery raw material used and a particle diameter of the sprayed oily confectionery raw material.

When the spraying work is continued for a long time, fine particles of the sprayed oily confectionery raw material inevitably attach to the nozzle 13 and the nozzle cap 1. When cooled, the attached particles are hardened to provide a nonuniform spraying of the oily confectionery raw material. To avoid this condition, the cap heater 11 is provided in the spray apparatus.

Therefore, the spray apparatus of the invention is well adaptable to the spraying of oily confectionery raw materials such as chocolate, white chocolate, oily cream, or the like.

EXAMPLES

The spray apparatus according to the present invention will be specifically described in the following examples. However, the present invention is not limited in these examples.

Example 1

Chocolate materials consisting of 25 parts by weight of cacao mass, 20 parts by weight of cacao butter, 20 parts by weight of powdered milk, 35 parts by weight of sugar, 0.5 part by weight of lecithin, and 0.1 part by weight of vanillin were agitated and mixed. The mixture was processed in an ordinary manner, viz. it was subjected to refiner process and conching process, and chocolate material was prepared.

The spray apparatus as shown in FIGS. 1 and 2 was used (diameter of the nozzle 13 was 5 mm). The chocolate material thus formed was temperature controlled and set at 32° C., and supplied into the spray apparatus the oily confectionery raw material inlet 8 under pressure of 2 Kg/cm$^2$ by use of a pump. Compressed air of 2 Kg/cm$^2$ was supplied through the spray air inlet 12. Temperature of the cap heater 11 was set at 33° C. The nozzle-cap drive control sensor 6 was set so as to locate the nozzle cap 1 at a position distanced 2 mm in front of the nozzle 13. The distance of 2 mm was measured by the nozzle-cap drive control sensor 6. Compressed air of 2 Kg/cm$^2$ was introduced into the apparatus through the compressed air inlet 7 to move the needle 9 to a position located behind the nozzle and to spray the chocolate material through the discharge orifice of the nozzle. The chocolate material was sprayed to a plane located vertically under the discharge orifice and at a position distanced 700 mm from the same. The spray apparatus sprayed the chocolate material uniformly over a circle area of 500 mm in diameter on the plane. The diameter of the chocolate particles was in the range from 1.0 mm to 1.5 mm.

Example 2

Example 2 used the chocolate material that was prepared in the same manner as in example 1, and introduced into the apparatus under the same condition as in the example 1. The nozzle cap 1 was moved to and set at a position distanced 1 mm in front of the nozzle 13 on the basis of the result of the measurement by the nozzle-cap drive control sensor 6. In this state, compressed air of 2 Kg/cm$^2$ was introduced into the apparatus through the compressed air inlet 7 to move the needle 9 to a position located behind the nozzle and to spray the chocolate material through the discharge orifice of the nozzle. The chocolate material was sprayed toward a plane located right under the discharge orifice and at a position distanced 700 mm from the same. The spray apparatus sprayed the chocolate material uniformly over a circle area of 300 mm in diameter on the plane.

The diameter of the chocolate particles was in the range from 1.0 mm to 1.5 mm.

As seen from the foregoing description, the present invention succeeds in providing a spray apparatus which can independently control a spraying area and a particle size of the sprayed oily confectionery material in simple and automatic manner when the oily confectionery raw material is sprayed.

What is claimed is:

1. A spray apparatus, comprising:
   a nozzle;
   a nozzle cap disposed around said nozzle, and interlocked with a nozzle-cap-bar drive disc through a nozzle cap driving bar;
   a cap-bar drive motor coupled to said nozzle-cap-bar drive disc to impart linear movement to said nozzle-cap-bar drive disc; and
   a nozzle-cap drive control sensor coupled to said motor, for controlling a gap between said nozzle cap and said nozzle to achieve a desired spraying area.

2. A spray apparatus according to claim 1, further comprising a cap heater provided on said nozzle.

3. A spray apparatus according to claim 2, wherein said cap heater is for heating said nozzle to a temperature which is higher than that of a material to be sprayed therethrough.

4. A spray apparatus, comprising:
   a nozzle for spraying a material therethrough;
   a nozzle cap disposed around said nozzle for linear movement between (1) a retracted position in which said nozzle cap abuts against said nozzle, and (2) an extended position in which said nozzle cap is spaced apart from said nozzle to define a gap therebetween;
   a nozzle cap driving bar coupled to said nozzle cap;
   a nozzle-cap-bar drive disc coupled to said nozzle cap driving bar;
   a cap-bar drive motor coupled to said nozzle-cap-bar drive disc for imparting linear movement to said nozzle-cap-bar drive disc and moving said nozzle cap to said retracted and said extended positions; and
   a nozzle-cap drive control sensor coupled to said motor, for controlling said linear movement of said nozzle-cap-bar drive disc to achieve a desired spraying area.

* * * * *